US007441696B2

(12) United States Patent
Bolles

(10) Patent No.: US 7,441,696 B2
(45) Date of Patent: Oct. 28, 2008

(54) LOCKING MECHANISM FOR A THEFT-RESISTANT MAILBOX

(76) Inventor: David J. Bolles, 2005 E. Lake Sammamish Pl. SE., Sammamish, WA (US) 98075

(*) Notice: Subject to any disclaimer, the term of this patent is extended or adjusted under 35 U.S.C. 154(b) by 0 days.

(21) Appl. No.: 11/805,993

(22) Filed: May 24, 2007

(65) Prior Publication Data

US 2008/0035720 A1 Feb. 14, 2008

Related U.S. Application Data

(60) Provisional application No. 60/808,469, filed on May 24, 2006.

(51) Int. Cl.
*B65G 11/04* (2006.01)

(52) U.S. Cl. .............................. 232/45; 70/160; 70/417

(58) Field of Classification Search ................... 232/45, 232/44, 17; 70/160–162, 63, 355, 417
See application file for complete search history.

(56) References Cited

U.S. PATENT DOCUMENTS

| | | | | |
|---|---|---|---|---|
| D177,616 | S | 5/1956 | Dreyfuss | |
| 4,361,271 | A | 11/1982 | Hester et al. | |
| 4,823,571 | A * | 4/1989 | O'Gara | 70/139 |
| 5,143,284 | A | 9/1992 | Socarras | |
| 5,400,960 | A | 3/1995 | Jeffs | |
| 5,407,126 | A * | 4/1995 | Coultas et al. | 232/17 |
| 5,645,215 | A | 7/1997 | Marendt et al. | |
| 6,109,519 | A | 8/2000 | McClure | |
| 6,318,628 | B1 * | 11/2001 | Pangburn | 232/17 |
| D485,043 | S | 1/2004 | Nelson et al. | |
| 7,070,090 | B2 | 7/2006 | Ranen | |
| 7,178,717 | B1 | 2/2007 | Lindell | |
| 2005/0258226 | A1 | 11/2005 | Kujawa et al. | |
| 2006/0065706 | A1 | 3/2006 | Ranen | |
| 2007/0152031 | A1 | 7/2007 | Riker et al. | |
| 2007/0194096 | A1 * | 8/2007 | Pittman et al. | 232/45 |

* cited by examiner

*Primary Examiner*—William L. Miller
(74) *Attorney, Agent, or Firm*—Patrick J. S. Inouye; Krista A. Wittman

(57) ABSTRACT

A locking mechanism for a theft resistant mailbox includes a door assembly. A door is affixed to a frame by at least one pivot point. A cam includes a lever rotatably engaged to a fixed surface at a mounting point and defines a cutout oriented to be removably engaged to a striker attached to a separate surface abutting the fixed surface to form a lock for the door upon urging of the cam along an angle of rotation defined about the mounting point. An anti-pry plate is attached to the fixed surface and juxtapositioned about the cam throughout the angle of rotation by which the lock is effected. The fixed surface includes one of the frame and the door. The separate surface includes an other one of the frame and the door. The fixed surface and the separate surface are provided independent of the at least one pivot point.

20 Claims, 3 Drawing Sheets

LOCKING MECHANISM FOR A THEFT-RESISTANT MAILBOX

CROSS-REFERENCE TO RELATED APPLICATION

This non-provisional patent application claims priority under 35 U.S.C. § 119(e) to commonly-owned U.S. provisional patent application Ser. No. 60/808,469, filed May 24, 2006, the disclosure of which is incorporated by reference.

FIELD OF THE INVENTION

The invention relates in general to locking mechanisms and, in particular, to a locking mechanism for a theft-resistant mailbox.

BACKGROUND OF THE INVENTION

Recently, an increase in theft and overall concerns of personal security have drawn into question the wisdom of relying on non-locking mailboxes for curbside mail delivery. Mail delivered by a postal carrier is often left unguarded for hours or even days at a time. Valuable correspondence, such as bank statements, negotiable instruments, and credit cards, are placed at risk of being stolen, particularly in light of a rising trend in identity theft.

Providing a locking mechanism on mailboxes provides a partial solution. A lock helps to ensure that mail and other articles are securely stored and that access is limited. Conventional mailbox locking mechanisms generally utilize a standard lock and tumbler mounted to a hinged mailbox door. When rotated using the key on a closed mailbox door, the tumbler turns an internal cam that slides against a frame or recess within the mailbox and locks the mailbox door. However, the locked mailbox door can be compromised by forcibly prying the mailbox door using a lever, such as a screwdriver, to deform the internal cam and bend the mailbox door open, thereby gaining access to the contents stored within.

Therefore, there is a need for a mailbox locking mechanism that is resistant to prying and similar attack.

SUMMARY OF THE INVENTION

A mailbox locking mechanism includes a key and tumbler installable in the door of a standard mailbox. The tumbler is rotatably coupled to an internal cam, which includes a cutout formed on the far edge of the internal cam open in the angle of rotation. When the key is turned in a closed mailbox door, the cutout engages the internal cam over a striker pin that is fixedly attached to a frame within the interior of the mailbox. In addition, an anti-pry plate is fixedly attached to the mailbox door above the tumbler and surrounds the internal cam. Accordingly, when the mailbox door is locked, a would-be theft must overcome the holding force of the striker pin and anti-pry plate to gain entry, which requires force significantly greater than required to overcome a conventional lock-and-tumbler cam.

An embodiment provides a locking mechanism. A cam includes a lever rotatably engaged to a fixed surface at a mounting point and defines a cutout oriented to be removably engaged to a stationary receiver to form a lock upon urging of the cam along an angle of rotation defined about the mounting point. An anti-pry plate is fixedly attached to the fixed surface and juxtapositioned about the cam throughout the angle of rotation by which the lock is effected.

A further embodiment provides a door assembly with a locking mechanism. A door is affixed to a frame by at least one pivot point. A cam includes a lever rotatably engaged to a fixed surface at a mounting point and defines a cutout oriented to be removably engaged to a striker. The striker is fixedly attached to a separate surface abutting the fixed surface to form a lock for the door upon urging of the cam along an angle of rotation defined about the mounting point. An anti-pry plate is fixedly attached to the fixed surface and juxtapositioned about the cam throughout the angle of rotation by which the lock is effected. The fixed surface includes one of the frame and the door. The separate surface includes an other one of the frame and the door. Both the fixed surface and the separate surface are provided independent of the at least one pivot point.

A still further embodiment provides a secure mailbox assembly. A housing defines a substantially enclosed space and includes a locking door affixed to a frame provided within the housing by at least one pivot point and admits access to the enclosed space. A cam includes a lever rotatably engaged to a fixed surface at a mounting point and defines a cutout oriented to be removably engaged to a striker. The striker is fixedly attached to a separate surface abutting the fixed surface to form a lock for the door upon urging of the cam along an angle of rotation defined about the mounting point. An anti-pry plate is fixedly attached to the fixed surface and juxtapositioned about the cam throughout the angle of rotation by which the lock is effected. The fixed surface includes one of the frame and the door. The separate surface includes an other one of the frame and the door.

Still other embodiments of the invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

DETAILED DESCRIPTION

Theft-Resistant Mailbox with Conventional Mounting Bracket

Figure 1:
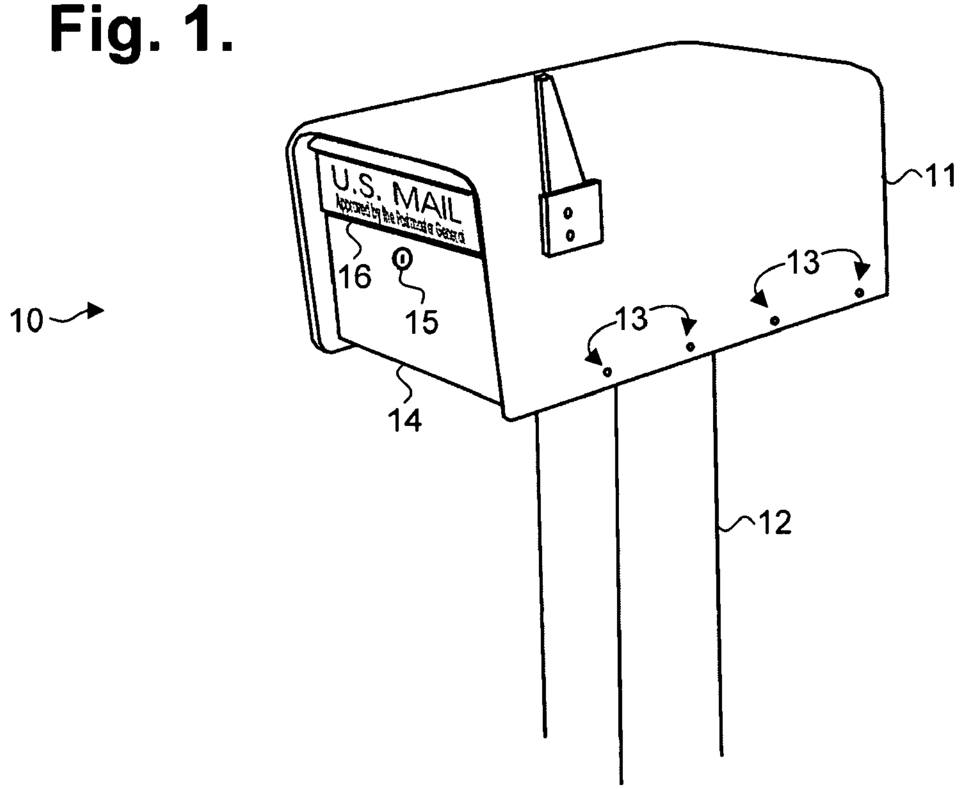
FIG. 1 is a perspective view showing, by way of example, a theft-resistant mailbox with conventional mounting bracket, in accordance with one embodiment.

Conventionally, mailboxes are frequently installed on a mounting post or other level surface to permit easy curbside access by postal delivery vehicles and mail carriers. FIG. 1 is a perspective view showing, by way of example, a theft-resistant mailbox 10 with conventional mounting bracket, in accordance with one embodiment. The mailbox 10 includes a housing 111 that is roughly rectangular in shape, but which is open on the bottom and front surfaces. The front surface generally means the side of the mailbox 10 by which mail is received through one or more doors. The housing 11 is installed on a mounting post or other level surface 12 using a conventional mounting bracket (not shown). The housing is fixedly attached to the mounting bracket with housing fasteners 13, which are generally exposed around the outer bottom margin or other outside surface of the housing 11.

The mailbox 10 also includes a lockable mail delivery door 14 and non-lockable mail receipt door 16, which are pivotably mounted on the front surface. The lockable door 14 prevents access to delivered mail or articles, except by those individuals having a key to operate a locking mechanism 15, as further described below beginning with reference to FIG. 3. The non-lockable door 16 allows mail carriers and other individuals to deliver mail and other articles into the mailbox 10 and to retrieve items left for pickup. Other forms of theft-resistant mailboxes and conventional mounting configurations are possible.

Theft-Resistant Mailbox with Secure Mounting Bracket

Figure 2:
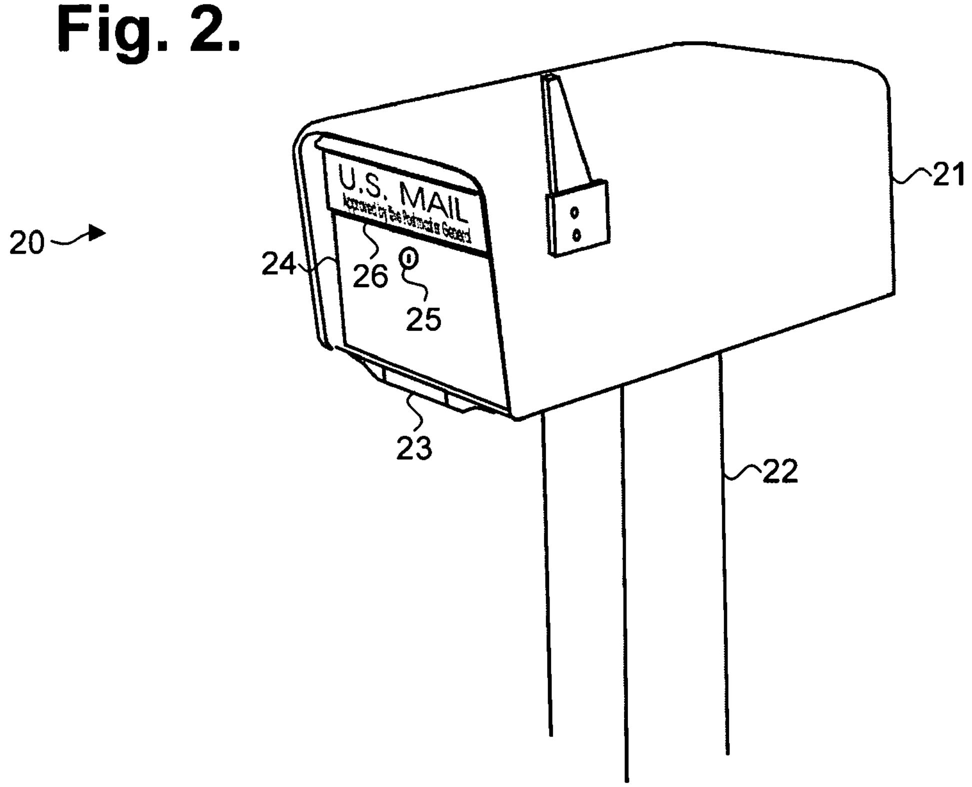
FIG. 2 is a perspective view showing, by way of example, a theft-resistant mailbox with secure mounting bracket, in accordance with a further embodiment.

A locking mechanism is only effective provided that the entire mailbox is not stolen, such as where a thief, out of desperation or expediency, removes the entire mailbox assembly by jimmying or breaking the mailbox from the mounting. FIG. 2 is a perspective view showing, by way of example, a theft-resistant mailbox 20 with secure mounting bracket 23, in accordance with a further embodiment. The secure mounting bracket 23 enables the mailbox 20 to be robustly installed without exposing mounting hardware to breakage or compromise. The bracket 23 can be robustly secured to a mounting post 22, or other level or horizontal surface through internally accessible post and housing fasteners, such as described in commonly-assigned U.S. patent application, entitled "Theft-Resistant Mailbox With Secure Mounting Bracket And Method Of Constructions Thereof," Ser. No. 11/440,644, filed May 24, 2006, pending, the disclosure of which is incorporated by reference.

The remaining components of the mailbox 20 are constructed in a manner similar to the theft-resistant mailbox 10 with conventional mounting bracket as described above with reference to FIG. 1. The mailbox 20 thus includes a roughly rectangular housing 21, lockable mail delivery door 24, and non-lockable mail receipt door 26. The lockable door 24 similarly prevents access, except by those individuals having a key to operate a locking mechanism 25, as further described below beginning with reference to FIG. 3. Other forms of theft-resistant mailboxes and secure mounting configurations are possible.

Locking Mechanism

Figure 3:
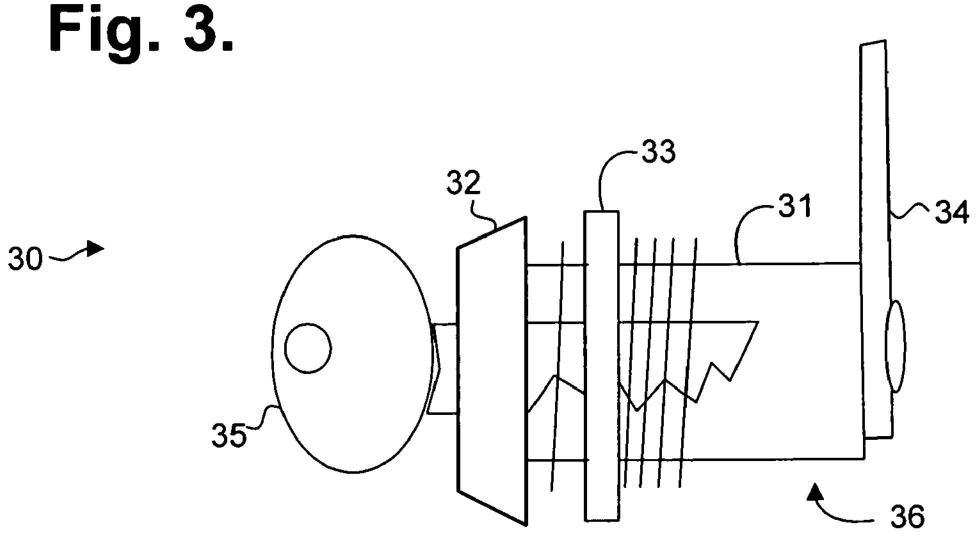
FIG. 3 is a side elevational view showing a locking mechanism for a theft-resistant mailbox, in accordance with one embodiment.

Providing a locking mechanism on mailbox doors helps to ensure that mail and other articles are securely stored and that access is limited. FIG. 3 is a side elevational view showing a locking mechanism 30 for a theft-resistant mailbox, in accordance with one embodiment. The locking mechanism 30 includes a locking tumbler 31 and matching key 35, which are installable in a mailbox door or similar enclosure, such as an automotive glove box or a furniture cabinet. Additionally, the locking mechanism 30 could be installed on a fixed surface against which a door opening abuts.

Figure 4:
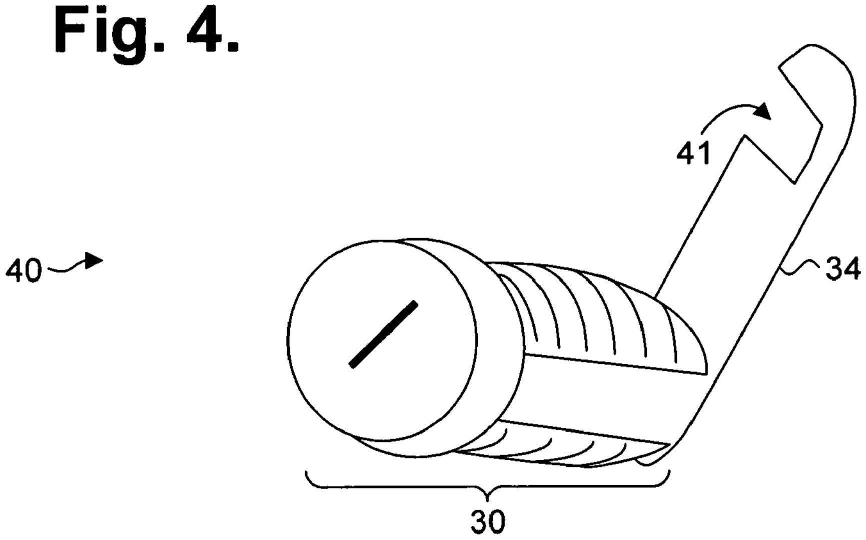
FIG. 4 is perspective view showing the locking mechanism of FIG. 3.

The locking mechanism 30 is installed by fitting the tumbler 31 through a fitted opening sized to receive the outside barrel 36 of the tumbler 31 and sliding the tumbler 31 into the opening until the inside edge of a keyway facing 32 engages the outer edge of the mailbox door. The locking mechanism 30 is fastened into place by tightening a retaining bolt 33, or similar fastener, such as a retaining clip or fastener assembly. The tumbler 31 is rotatably coupled to an internal cam 34, which locks the mailbox door when the door is closed and the key 35 is turned. The internal cam 34 rotates freely in the same direction as the key 35, while the outside barrel 36 of the tumbler 31 remains fixed in place on the mailbox door. FIG. 4 is perspective view 40 showing the locking mechanism 30 of FIG. 3. The far edge of the internal cam 34 is formed into a cutout 41 that is open in the angle of rotation. The cutout 41 can be square or rectangular, as well as U- or C-shaped. Other shapes of cutouts are possible.

Figure 5:
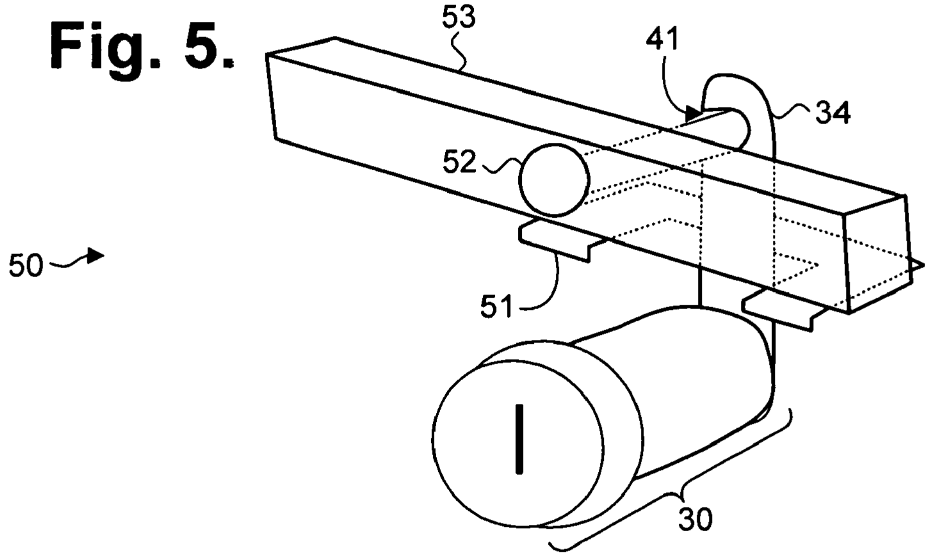
FIG. 5 is perspective view showing the locking mechanism of FIG. 3 as installed within a theft-resistant mailbox.

The locking mechanism 30 also includes components installed within the mailbox. FIG. 5 is perspective view showing the locking mechanism 30 of FIG. 3 as installed 50 within a theft-resistant mailbox. A striker pin 52 is fixedly attached to a frame 53 within the interior of the mailbox. The cutout 41 is sized to be received over the striker pin 52. When the key 35 is turned, the cutout 41 engages the internal cam 34 over the striker pin 52. In addition, an anti-pry plate 51 is fixedly attached to the inside surface of the mailbox door above the tumbler 31. The anti-pry plate 51 surrounds the internal cam when the locking mechanism is in the locked position.

Figure 6:
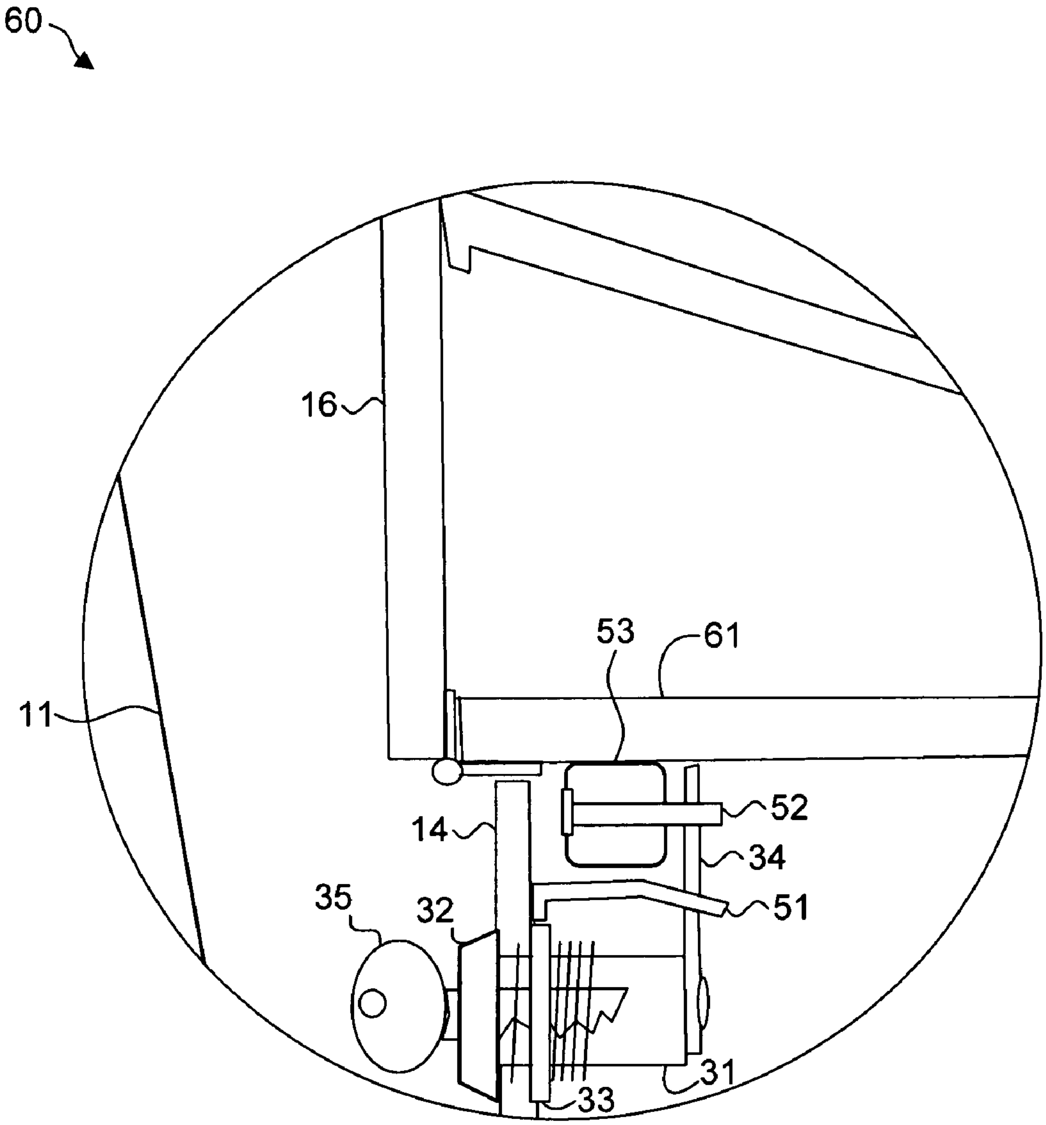
FIG. 6 is a cross-sectional view showing the locking mechanism of FIG. 3 as installed within a theft-resistant mailbox.

The internal cam 34, striker pin 52, and anti-pry plate 51 synergistically protect a mailbox door against compromise. FIG. 6 is a cross-sectional view 60 showing the locking mechanism 30 of FIG. 3 as installed within a theft-resistant mailbox 11. The frame 53 is fixably attached to a chassis 61 of the mailbox 11. Additionally, the striker pin 52 extends beyond the point of engagement to the internal cam 34. A prying force applied to the mailbox door 14 would be transferred onto the mailbox chassis 61 through the combination of the cutout 41, striker pin 52, and frame 53, as well as onto the mailbox door 14 through the anti-pry plate 51. As a result, a would-be theft would have to provide force significantly greater than required to overcome a conventional key-and-tumbler cam.

While the invention has been particularly shown and described as referenced to the embodiments thereof, those skilled in the art will understand that the foregoing and other changes in form and detail may be made therein without departing from the spirit and scope of the invention.

What is claimed is:

1. A locking mechanism, comprising:

a cam comprising a lever rotatably engaged to a fixed surface at a mounting point and defining a cutout removably engaged to a stationary receiver to form a lock upon urging of the cam along an angle of rotation defined about the mounting point; and an anti-pry plate fixedly attached to the fixed surface and juxtapositioned about the cam throughout the angle of rotation by which the lock is effected.

2. A locking mechanism according to claim 1,wherein the stationary receiver comprises a striker fixedly attached to a separate surface abutting the fixed surface.

3. A locking mechanism according to claim 2, wherein the striker extends beyond a point of engagement to the cam.

4. A locking mechanism according to claim 2, wherein the fixed surface comprises one of a frame and a door pivotably affixed to the frame and the separate surface comprises the other one of the frame and the door.

5. A locking mechanism according to claim 1, further comprising:

a tumbler assembly, comprising:

an exterior barrel oriented to be fixedly received into an opening through the fixed surface; and a tumbler positioned within the exterior barrel and rotatably coupled to the cam about the mounting point.

6. A locking mechanism according to claim 5, further comprising:

a keyway defined within the tumbler with an opening provided opposite the mounting point of the cam; and a key removably insertable into the opening and configured to engage the keyway to enable rotation of the tumbler and the cam through the angle of rotation.

7. A locking mechanism according to claim 5, wherein the tumbler assembly is fixedly attached to the fixed surface with one or more of a retaining bolt, a retaining clip, and a fastener.

8. A locking mechanism according to claim 1, wherein the cutout on the lever comprises at least one of a square, rectangle, U-shape, and C-shape.

9. A door assembly with a locking mechanism, comprising:

a door affixed to a frame by at least one pivot point;

a cam comprising a lever rotatably engaged to a fixed surface at a mounting point and defining a cutout removably engaged to a striker fixedly attached to a separate surface abutting the fixed surface to form a lock for the door upon urging of the cam along an angle of rotation defined about the mounting point; and an anti-pry plate fixedly attached to the fixed surface and juxtapositioned about the cam throughout the angle of rotation by which the lock is effected, wherein the fixed surface comprises one of the frame and the door and the separate surface comprises the other one of the frame and the door, and both the fixed surface and the separate surface are provided independent of the at least one pivot point.

10. A door assembly according to claim 9, further comprising:

a locking tumbler comprising an exterior barrel mounted onto the fixed surface and a keyed tumbler positioned within the exterior barrel and rotatably coupled to the cam about the mounting point.

11. A door assembly according to claim 9, wherein the cutout comprises at least one of a square, rectangle, U-shape, and C-shape.

12. A door assembly according to claim 9, wherein the door comprises at least one of a mailbox door, automotive glove box door, and furniture cabinet door.

13. A secure mailbox assembly, comprising:

a housing defining a substantially enclosed space and comprising a locking door affixed to a frame provided within the housing by at least one pivot point and admitting access to the enclosed space;

a cam comprising a lever rotatably engaged to a fixed surface at a mounting point and defining a cutout removably engaged to a striker fixedly attached to a separate surface abutting the fixed surface to form a lock for the door upon urging of the cam along an angle of rotation defined about the mounting point; and an anti-pry plate fixedly attached to the fixed surface and juxtapositioned about the cam throughout the angle of rotation by which the lock is effected, wherein the fixed surface comprises one of the frame and the door and the separate surface comprises the other one of the frame and the door.

14. A secure mailbox assembly according to claim 13, wherein both the fixed surface and the separate surface are provided independent of and located distally from the at least one pivot point.

15. A secure mailbox assembly according to claim 13, further comprising:

a locking tumbler comprising an exterior barrel mounted onto the fixed surface and a keyed tumbler positioned within the exterior barrel and rotatably coupled to the cam about the mounting point.

16. A secure mailbox assembly according to claim 13, further comprising:

a mounting surface; and a mounting bracket fixedly attached to the mounting surface and the housing.

17. A secure mailbox assembly according to claim 16, further comprising:

one or more housing fasteners to affix the housing to the mounting bracket.

18. A secure mailbox assembly according to claim 17, wherein the one or more housing fasteners are disposed about an exposed surface of the housing.

19. A secure mailbox assembly according to claim 16, further comprising:

one or more post fasteners to affix the mounting bracket to the mounting surface.

20. A secure mailbox assembly according to claim 13, further comprising:

a non-locking door further affixed to the frame by at least one separate pivot point and admitting limited access to the enclosed space.

* * * * *